United States Patent
Schlanger

(10) Patent No.: US 9,662,931 B2
(45) Date of Patent: May 30, 2017

(54) VEHICLE WHEEL HUB ASSEMBLY

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 0 days.

(21) Appl. No.: 14/863,583

(22) Filed: Sep. 24, 2015

(65) Prior Publication Data
US 2016/0114620 A1    Apr. 28, 2016

Related U.S. Application Data

(60) Provisional application No. 62/122,648, filed on Oct. 27, 2014.

(51) Int. Cl.
*B60B 1/04* (2006.01)
*B60B 27/02* (2006.01)
*B60B 1/00* (2006.01)
*B60B 1/02* (2006.01)

(52) U.S. Cl.
CPC .............. *B60B 1/041* (2013.01); *B60B 1/003* (2013.01); *B60B 1/042* (2013.01); *B60B 27/023* (2013.01); *B60B 1/02* (2013.01); *B60B 1/04* (2013.01); *B60B 1/043* (2013.01); *B60B 2310/30* (2013.01); *B60B 2320/14* (2013.01); *B60B 2900/531* (2013.01); *Y02T 10/86* (2013.01)

(58) Field of Classification Search
CPC   B60B 1/04; B60B 1/041; B60B 1/042; B60B 1/003; B60B 1/02; B60B 27/023
USPC .................................. 301/59, 61; 29/894.343
See application file for complete search history.

(56) References Cited

U.S. PATENT DOCUMENTS

| | | | | |
|---|---|---|---|---|
| 582,486 | A * | 5/1897 | Rowe ..................... | B60B 1/042 301/58 |
| 5,494,337 | A * | 2/1996 | Behnke ................... | B60B 1/041 301/104 |
| 5,795,036 | A * | 8/1998 | Campagnolo ......... | B60B 1/0261 301/59 |
| 6,036,279 | A * | 3/2000 | Campagnolo ......... | B60B 1/0261 301/55 |
| 6,189,978 | B1 * | 2/2001 | Lacombe .............. | B60B 1/0246 301/104 |
| 6,346,423 | B1 * | 2/2002 | Schembri ............. | B01J 19/0046 422/129 |
| 7,631,944 | B2 * | 12/2009 | Meggiolan ............ | B60B 1/0261 301/104 |
| 2001/0054840 | A1* | 12/2001 | Schlanger ............... | B60B 1/003 301/59 |
| 2008/0129105 | A1* | 6/2008 | Urbani .................. | B60B 1/0246 301/57 |
| 2008/0258538 | A1* | 10/2008 | Tsai Tu .................. | B60B 1/041 301/56 |
| 2010/0194183 | A1* | 8/2010 | Chiang .................. | B60B 1/041 301/110.5 |
| 2013/0181503 | A1* | 7/2013 | Schlanger ............... | B60B 1/003 301/58 |

* cited by examiner

*Primary Examiner* — Kip T Kotter

(57) ABSTRACT

A vehicle wheel hub assembly including an axle extending along an axial axis, a hub shell with a hub flange that is rotatable about the axle, a bearing and at least one spoke assembled and connected to the hub flange at the opening. The hub flange includes an opening to receive the spoke. The axle includes an aperture that serves to provide assembly clearance to reduce or eliminate deformation of the spoke during the assembly of the spoke with the opening.

30 Claims, 10 Drawing Sheets

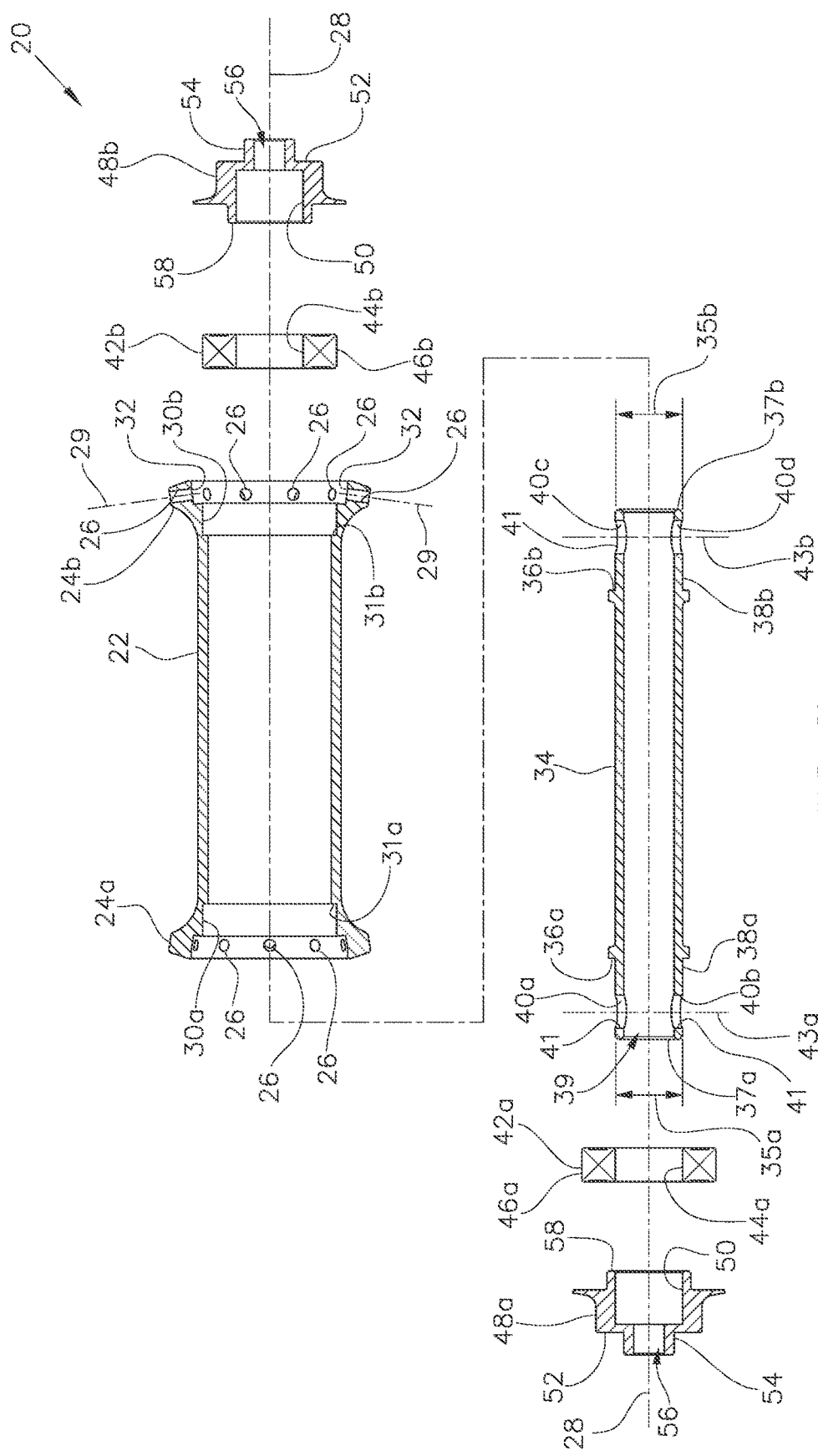

VEHICLE WHEEL HUB ASSEMBLY

CROSS-REFERENCE TO RELATED APPLICATION

This application claims priority of U.S. Provisional Patent application Ser. No. 62/122,648, filed Oct. 24, 2014.

BACKGROUND

Field of the Invention

The present invention relates to a vehicle wheel axle that includes an aperture and/or relief therein to provide clearance for a corresponding spoke to be assembled with a corresponding hub flange. It is preferred that the spoke may remain straight and un-bent during this assembly. The lack of such an aperture and/or relief would require that the spoke be bent or otherwise significantly deformed in order to achieve this assembly.

Description of the Related Art

Heretofore, bicycle wheel hub assemblies that utilize straight pull spokes have resorted to a variety of prior art configurations that are undesirably compromised in terms of structural efficiency, excessive weight, and/or complexity of design, in an effort to allow the spoke to be assembled to the hub flange.

One such compromise is to utilize open slots of the hub flange to receive the spokes instead of enclosed holes. These designs require the use of an additional secondary retaining means to insure that the spoke remains engaged to its associated open slot and is not inadvertently ejected therefrom due to de-tensioning of the spoke, which commonly occurs due to the wheel hitting an obstruction in its path and/or due to a broken spoke. If the spoke becomes disengaged, the structural integrity and trueness of the wheel is compromised. Further, this open slot design cannot support as high a spoke tension load as an enclosed hole, since the open slot geometry only hooks and engages the spoke head at two laterally opposing locations and does not engage the full circular perimeter of the transition surface of the spoke head. To compensate for this limited engagement area provided by the open slot, the hub flange must be made thicker and stronger, which adds significant weight and cost to the hub flange.

A second such compromise is to utilize enclosed spoke holes, but then require that the axle be extracted and removed from the hub shell in order to assemble the spoke to the spoke hole. Particularly since the bearings are usually a press fit with the hub shell, which must be disassembled for spoke replacement, this additional step adds excessive labor and cost to the process of assembling and/or disassembling the spoke from the spoke hole. Further, due to the requisite complexity of this process, field replacement of a spoke becomes something that can only be achieved by an experienced mechanic and is not a procedure that can be performed by most lay-users.

A third such compromise is to significantly limit the axially outward distance that the collar of the axle protrudes from the bearing. While this reduced protrusion distance may provide the clearance required to assemble the spoke through an enclosed spoke hole (with the axlecap temporarily removed), this reduced distance also corresponds to a reduced axial overlap with the axle cap. This reduced axial overlap provides much reduced piloting and alignment between the collar portion of the axle and the axlecap, which serves to weaken this connection and permits the axlecap to become more easily dislodged due to radial loading on the wheel, etc.

A fourth such compromise is to place the axially overlapping sleeved engagement between the axle and axlecap at a location axially inboard of the bearing. While this axially inboard engagement may provide the clearance required to assemble the spoke through an enclosed spoke hole (with the axlecap temporarily removed), this axially inboard location also increases the stress on this sleeved engagement (due to lateral and radial loads on the wheel) in comparison with an axially outboard sleeved engagement. As an attempt to compensate for this increased stress, the axle and axlecap must be made thicker and stronger, which adds significant weight and cost to the hub flange.

Accordingly, it is an objective of the present invention to overcome the forgoing compromises and disadvantages and to provide a hub arrangement that is lightweight, strong, and inexpensive to produce.

It is an additional object of the present invention to permit assembly of the spoke to the hub flange to minimize or eliminate deformation of the spoke as it is assembled to the hub flange of a hub shell.

It is a further object of the present invention to provide a hub assembly that permits the assembly of the spoke to the hub flange that includes enclosed spoke holes for greater strength and lighter weight.

Still further, it is an object of the present invention to provide a hub assembly where the spoke may be assembled and/or disassembled from the hub flange with the axle remaining assembled to the hub assembly and without requiring that the axle be first disassembled from the hub assembly.

Yet further, it is an object of the present invention to provide a hub assembly where the collar portion of that axle protrudes axially outwardly from the bearing and that this axial outward protrusion distance provides sufficient axial overlapping engagement with the axlecap to provide a robust connection therebetween. This axial overlap provides requisite piloting and alignment of the axlecap and has the requisite bending moment strength to support loads that the bicycle wheel may be subject to.

Further objects and advantages of the present invention will appear hereinbelow.

SUMMARY OF THE INVENTION

In accordance with the present invention, it has now been found that the forgoing objects and advantages may be readily obtained.

The present invention comprises an axle, a hub shell, and at least one bearing. The axle includes an aperture and/or relief therein to facilitate assembly of a spoke with a spoke opening of the hub shell.

With high-performance bicycle hubs, it is highly desirable that the hub be lightweight, strong, stiff, and economical. Excessive weight, cost, and/or flexiness will significantly detract from the performance and perceived value of the hub.

In a preferred embodiment, the hub shell will be rotatable about the axle via two axially spaced bearing assemblies. It is preferable that the axial distance between these bearings be as wide as geometry constraints allow, to reduce stresses and flexure of the assembly. Heretofore, one of these geometry constraints had to do with the spoke holes, the axle, and the requisite clearance needed to assemble the spoke to the spoke hole. Since the present invention incorporates an aperture in the axle, this permits the bearings to be spaced more widely than prior art designs, while still allowing the spoke to be assembled to the spoke holes of the hub flange. This wide spacing serves to reduce bending stress and flex of the axle, and allows the axle and corresponding components to be thinner and lighter in weight. This wider spacing also reduces the load on the bearing assemblies, permitting the use of smaller and lighter weight bearing assemblies.

Further, since the present invention incorporates an aperture in the axle, this permits the spokes to be assembled to the hub with the axle in place. In contrast to prior art hub designs that require that the axle first be removed from the hub before assembling the spoke to the hub flange, the present invention permits the spoke(s) to be assembled to the hub flange without first removing the axle. This reduces the time, labor, and complexity involved in assembling and/or disassembling the spoke from/to the hub flange.

Still further, since the present invention incorporates an aperture in the axle, this permits the axlecap to have a larger axial overlap distance with the axle. This larger overlap serves to maintain the piloted alignment of the axlecap relative to the axle and also serves to maintain this alignment even under high radial loads to the axle via the axlecap. As such, the axle and axlecap may be made to be thinner to save weight, while also reducing the axle movement associated with misalignment of the axlecap. With the smaller axial overlap of prior art designs, the axlecap may more easily become misaligned and displaced due to these radial loads.

Yet further, including the aperture in the axle can be achieved quite economically, preferably in a simple drilling and/or milling fabrication process. As such, the present invention may be produced more economically than prior art designs, which require very complex fabrication to produce the open slots of the hub flange to receive the spokes.

It may be seen that the embodiments described herein are highly effective at reducing weight, increasing stiffness, and maintaining alignment of the hub assembly. It may also be seen that the present invention may be produced economically and also permits easy and convenient assembly/disassembly of the spoke to the hub flange, without requiring special tools.

Further features of the present invention will become apparent from considering the drawings and ensuing description.

BRIEF DESCRIPTION OF THE DRAWINGS

The present invention will be more readily understandable from a consideration of the accompanying drawings, wherein:

FIG. 2b is an exploded cross section view, taken along 90-90, of the embodiment of FIG. 2a;

DETAILED DESCRIPTION OF THE INVENTION

Figure 1:
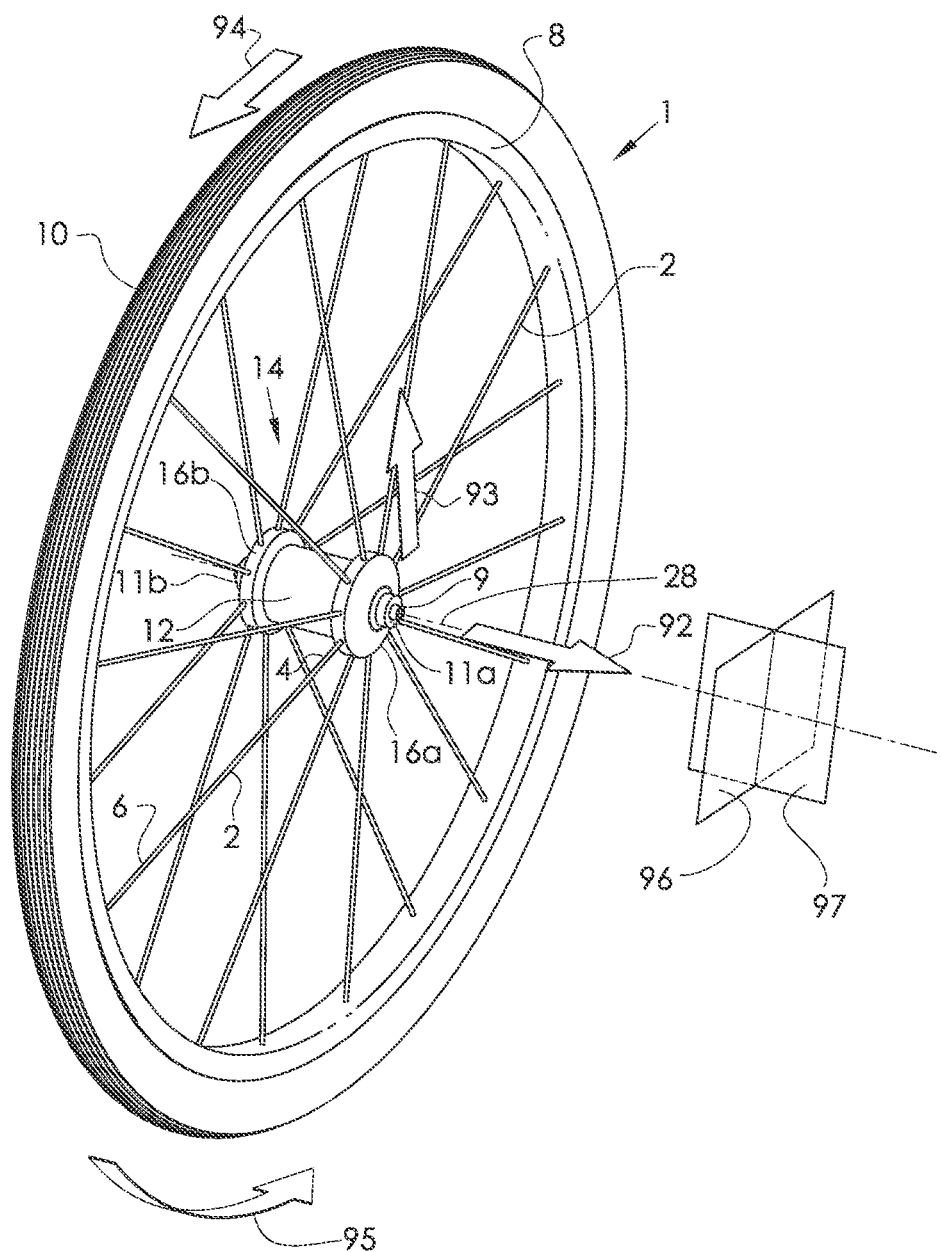
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the frame and the quick release skewer assembly are not shown in this figure.

The hub shell 14 is rotatable about the axle 9 and includes at least two axially spaced hub flanges 16a an 16b each of which include a means for connecting with the spokes 2. Axle 9 includes end faces 11a and 11b that define the spacing of its mounting with the frame (not shown). The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. It should be understood that the term "hub flange" is a conventional term and does not necessarily connote a flanged-shaped portion of the hub shell. Instead, the term "hub flange" merely refers to the portion of the hub shell 14 to which the spoke(s) are connected. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps circumferentially around the axial axis 28 at a given radius. A radial plane 96 is a plane perpendicular to the axial axis 28 that extends in a generally radial direction at a given axial intercept. An axial plane 97 is a plane that is generally parallel to the axial axis 28. An axially inboard (or inward) orientation is an orientation that is axially proximal to the axial midpoint between the two end faces 11a and 11b. Conversely, an axially outboard (or outward) orientation is an orientation that is axially distal from the axial midpoint between the two end faces 11a and 11b. A radially inboard (or inward) orientation is an orientation that is radially proximal to the axial axis 28 and a radially outboard (or outward) orientation is an orientation that is radially distal from the axial axis 28. An axially inwardly facing surface is a generally radial planar surface that faces toward the axial midpoint between the two end faces 11a and 11b. Conversely, an axially outwardly facing surface is a generally radial planar surface that faces away from the axial midpoint between the two end faces 11a and 11b.

Figure 2A:
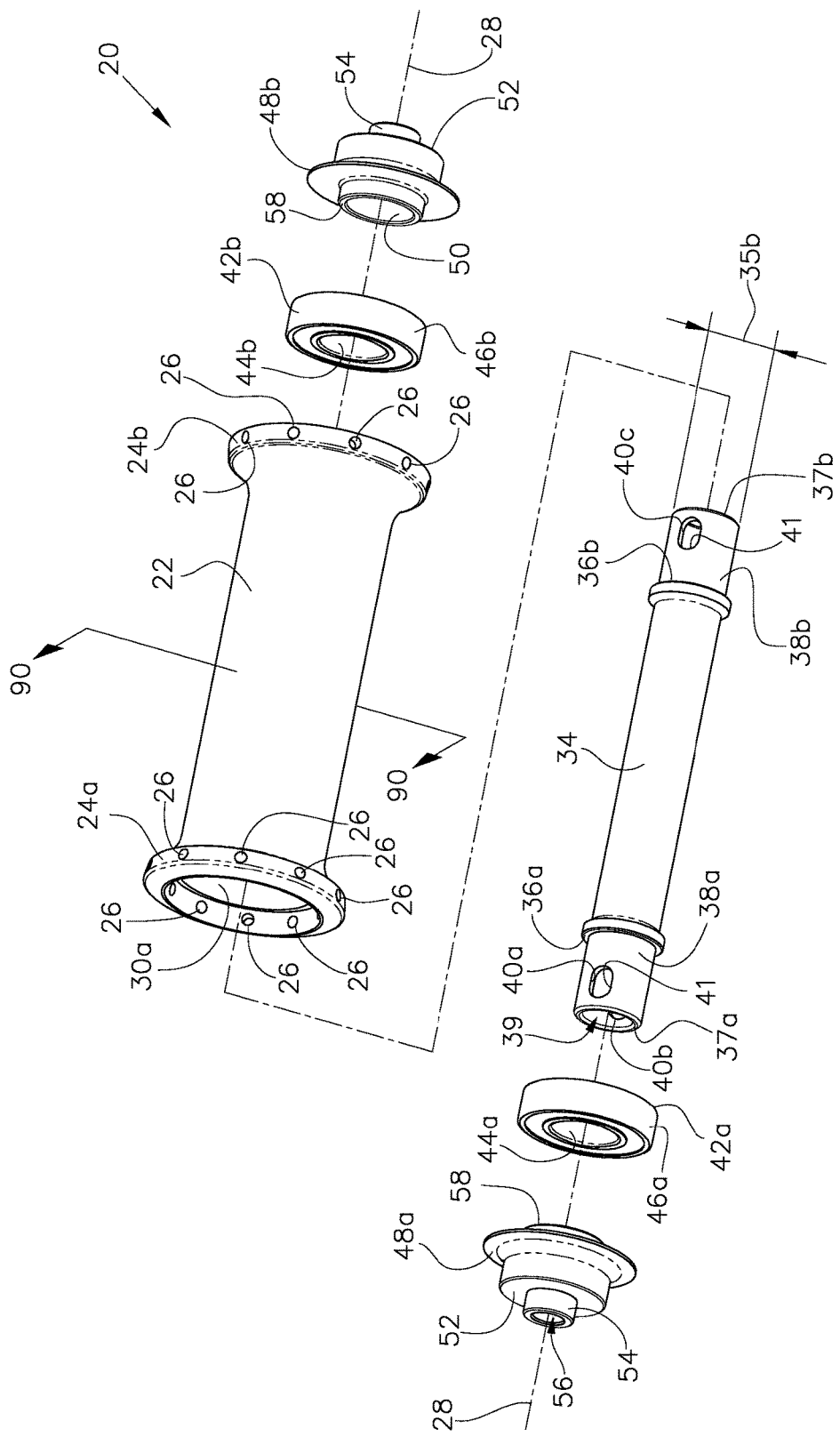
FIG. 2a is an exploded perspective view of a first embodiment of the present invention, showing the hub assembly, including an axle with apertures to facilitate assembly of the spokes with the hub flanges.
Figure 2C:
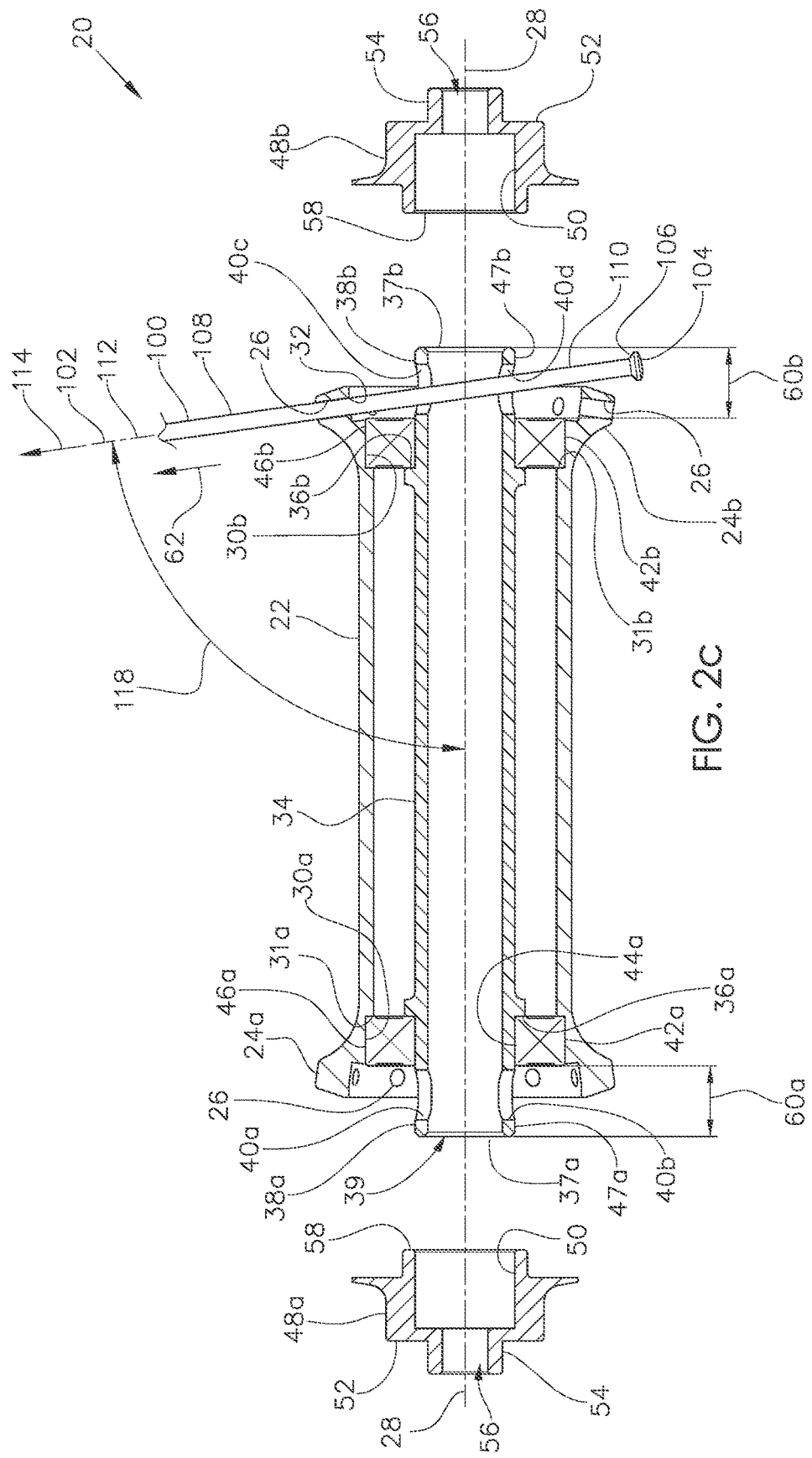
FIG. 2c is an exploded cross section view, taken along 90-90, of the embodiment of FIG. 2a, showing a first assembly step with the axle and bearings assembled to the hub shell, including a spoke partially assembled to the hub flange, with a portion of the spoke extending through an aperture of the axle, and including axlecaps prior to their assembly to the axle.

FIGS. 2a and 2b describe a first embodiment of the present invention, showing the components of a hub assembly 20 in exploded view. The hub shell 22 includes two axially disposed hub flanges 24a and 24b and bearing bores 30a and 30b with shoulders 31a and 31b. The hub flanges 24a and 24b each include a series of holes 26 that extend along a hole axis 29 to receive spokes 100 as shown in FIG. 2c. Hole axis 29 is shown here to be generally radial (as viewed along the axial axis 28) and generally aligned with the bracing angle 118 of the spoke(s) 100. Bearings 42a and 42b are of a conventional design, commonly referred to as "cartridge bearings" and include respective inner races 44a and 44b and outer races 46a and 46b, with a series of rolling elements (not shown) therebetween. Inner races 44a and 44b are commonly rotationally fixed to the axle 34, while outer races 46a and 46b are commonly rotationally fixed to the hub shell 22. Axle 34 includes two axially disposed shoulders 36a and 36b with corresponding collar portions 38a and 38b extending axially outwardly therefrom of diameter 35a and 35b respectively. Axle 34 is of a conventional design in that it is a hollow tubular element with an opening 39 therethrough and end faces 37a and 37b. Collar portion 38a is pierced to include apertures 40a and 40b that are generally radially opposed to each other. Similarly, collar portion 38b is pierced to include apertures 40c and 40d that are generally radially opposed to each other. Apertures 40a-d extend through their respective collar portions 38a and 38b, extending from the outer surface thereof to communicate with the opening 39. Apertures 40a-b and 40c-d are considered to be paired or double apertures that are aligned along common aperture axes 43a and 43b respectively. Paired apertures 40a and 40b are shown to be generally radially opposed to each other, as are paired apertures 40c and 40d. Axlecaps 48a and 48b are of a generally conventional configuration and each include bore 50, axially outwardly facing grip face 52 with stub collar 54 extending axially outwardly therefrom, and opening 56 to receive a conventional quick-release skewer (not shown). The axle 34, hub shell 22, bearings 42a and 42b, and axlecaps 48a and 48b are all shown as generally circular cylindrical elements that extend along axial axis 28. With the exception of apertures 40a-d, hub assembly 20 is of a generally conventional arrangement known in industry.

The hub assembly 20 shown here corresponds to conventions commonly associated with a front bicycle hub. It is understood that the present invention is not specific to front bicycle hubs or to the conventional configuration shown here and may instead be incorporated in a wide range of alternate hub designs, including rear bicycle hubs, among others.

Figure 2D:
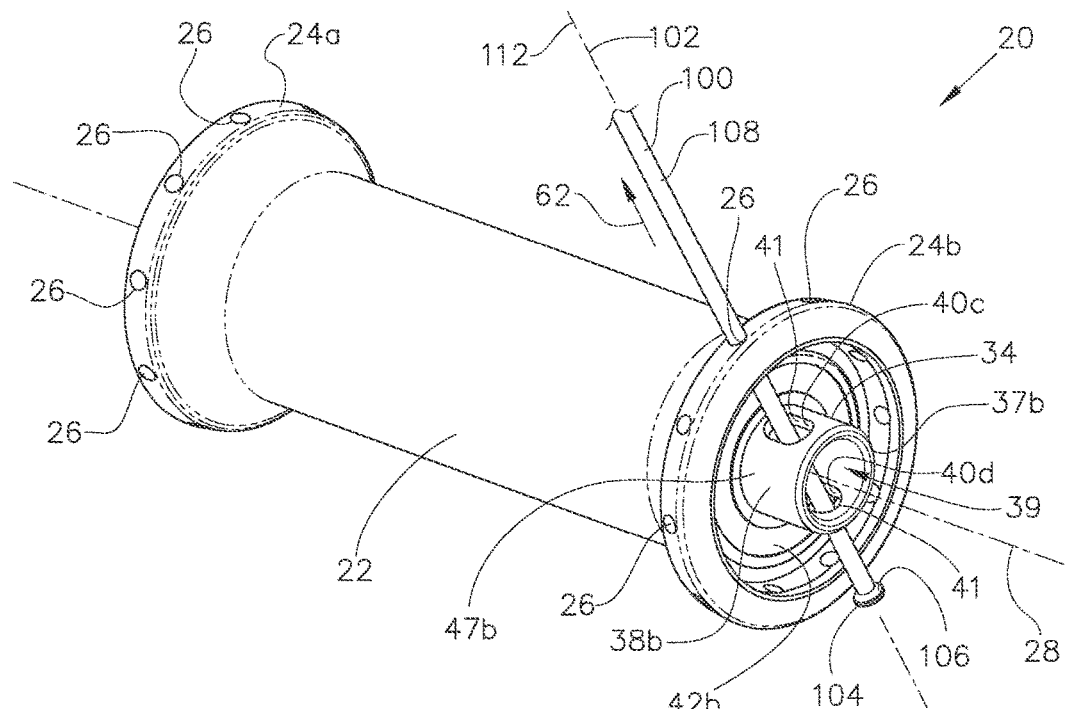
FIG. 2d is a perspective view of the of the embodiment of FIG. 2a, corresponding to the assembly sequence of FIG. 2c.

FIGS. 2c and 2d show the axle 34 and bearings 42a and 42b first assembled to the hub shell 22 in the conventional manner. Bearing 42a is positioned in bearing bore 30a with outer race 46a axially abutting shoulder 31a. Axle 34 is next assembled within hub shell 22 such that collar portion 38a extends through inner race 44a with inner race 44a axially abutting shoulder 36a. Next, bearing 42b is positioned in bearing bore 30b with outer race 46b axially abutting shoulder 31b, with collar portion 38a extending through inner race 44a and inner race 44a axially abutting shoulder 36a. Collar portion 38a includes a projecting portion 47a that extends to project axially outwardly from inner race 44a by projection distance 60a. Similarly, collar portion 38b includes a projecting portion 47b that extends to project axially outwardly from inner race 44b by projection distance 60b. Apertures 40c and 40d are shown to be axially outboard of bearing 42b and axially aligned with spoke hole(s) 26 of hub flange 24b. As shown in FIGS. 2c and 2d, axle 34 has been rotated about axial axis 28 relative to hub shell 22 and circumferentially positioned such that apertures 40c and 40d are generally radially aligned with hole 26 to allow the spoke 100 to simultaneously pass through apertures 40c-d and hole 26.

Spoke 100 includes a first end portion 110 with an enlarged head 104 and a shank portion 108 that extends longitudinally along longitudinal axis 102. Transition surface 106 extends generally laterally between shank portion 108 and enlarged head 104. The spoke 100 is of a generally conventional configuration commonly termed a "straight pull" spoke that includes a second end portion (not shown) that includes external threads (not shown) for connection to an outer rim (not shown). The spoke 100 may be made from a variety of materials well known in industry, including conventional spoke materials such as aluminum, titanium or stainless steel. Further, the spoke 100 may be monolithic as is common in industry or it may be a joined assembly of multiple components and/or portions.

The spoke 100 is a generally long slender tensile element with a longitudinal axis 102 along its length and generally parallel to its sidewalls. The spoke 100 also has a tensile axis 112 of applied tensile load 114, which is generally collinear to the longitudinal axis 102. For the purposes of definition, the term "longitudinal" herein refers to alignment along the longitudinal axis 102 and the term "lateral" refers to alignment in a direction generally perpendicular to the longitudinal axis 102. The tensile axis is the axis along which tensile loads are applied to the tensile element, and is commonly collinear with the longitudinal axis, particularly in the region of the structural span of the longitudinal tensile element. For the purposes of explanation herein, the term "longitudinal axis" is generally interchangeable with the term "tensile axis", unless otherwise noted. The spoke span is considered as the portion of the spoke that is under tension and that extends between its anchor points and/or engagements at the bracing elements (i.e. hub and rim). A location outboard of the spoke span is a location along the tensile axis that is beyond or external to the spoke span. Further, a longitudinally outward orientation refers to an orientation along the longitudinal axis that is distal from the midpoint of the span. Conversely, a longitudinally inward orientation refers to an orientation along the longitudinal axis 102 that is proximal to the midpoint of the span. In reference to the spoke 100, a lateral orientation or direction is an orientation or direction that is generally perpendicular to the longitudinal axis, with a laterally inward orientation proximal to the longitudinal axis 102 and a laterally outward orientation distal to the longitudinal axis 102.

As shown in FIGS. 2c and 2d, a first spoke 100 is next assembled to the hub flange 24b in the conventional manner by passing the shank portion 108 through a corresponding hole 26 in direction 62. During this assembly, the shank portion 108 is also passed through apertures 40c and 40d. These apertures 40c and 40d play a critical role in providing the requisite clearance to allow the spoke 100 to be passed through hole 26. In the absence of these apertures 40c and 40d, the spoke 100 would need to be bent in an extreme way to clear past the unpierced collar portion 38b. Since conventional spokes are generally rigid elements, such bending would be virtually impossible with the hub configuration shown in FIGS. 2a-f. Spoke 100 is further advanced in direction 62 until the transition surface 106 abuts and engages with the radially inboard edge 32 of hole 26. Next, the axle 34 may be rotationally indexed about axial axis 28 to align the apertures 40c and 40d with a second spoke hole 26 of hub flange 24b and a second spoke (not shown) may next be inserted through apertures 40c and 40d to be installed and engaged with this second hole 26 in the manner just described. Similarly, the axle 34 may be rotationally indexed about the axial axis 28 relative to the hub shell 22 to selectively align the apertures 40a-d with each of the full complement of holes 26. This selective alignment of apertures 40a-d permits the full complement of additional spokes 100 to be similarly assembled and engaged with their respective holes 26 of hub flanges 24a and 24b. It may be considered that apertures 40a-d provide assembly clearance to permit the spokes 100 to be assembled to holes 26 along the hole axis 29, which is commonly generally collinear with the longitudinal axis 102 of the spoke 100. Apertures 40a-d are generally radially aligned and generally axially aligned with their respective hole 26.

It is noted that hole axes 29 are preferably aligned to correspond to a bracing angle 118 relative to the axial axis 28. This bracing angle 118 alignment may be preferable since it allows the spoke 100 to be un-bent and aligned with its span between its respective hub flange 24a (or 24b) and its radially outboard anchor point at the rim (not shown).

Further, holes 26 are shown to be enclosed holes 26 in that they completely surround and enclose the cross section of the shank portion 108.

Figure 4A:
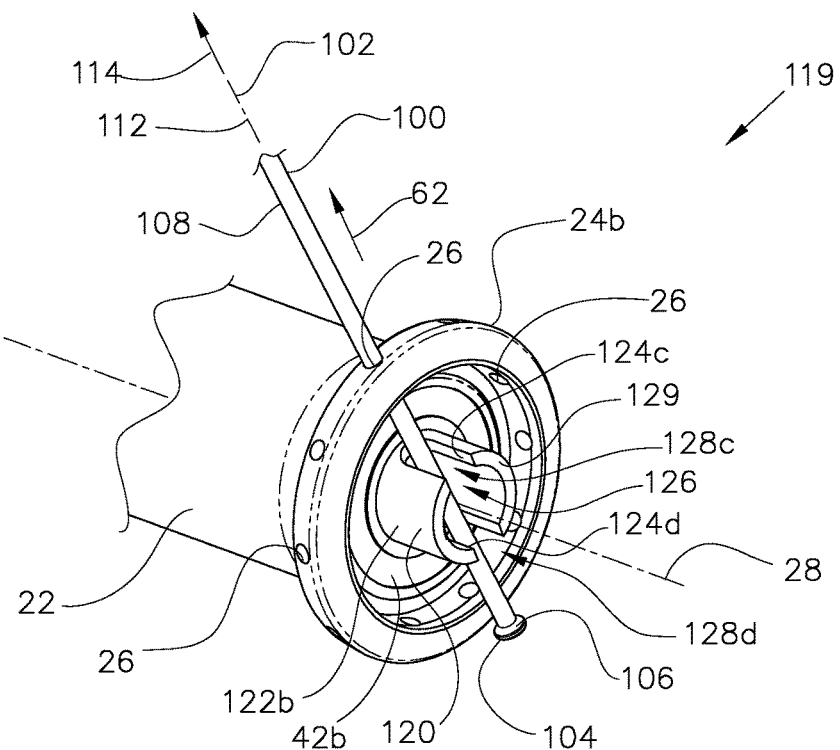
FIG. 4a is a partial perspective view of a second embodiment of the present invention, corresponding to the assembly sequence of FIG. 2d and including an axially extending open slot of the axle that pierces the end face of the axle to provide assembly clearance for the spoke upon assembly of the spoke during assembly with its respective hole of the hub flange.
Figure 4B:
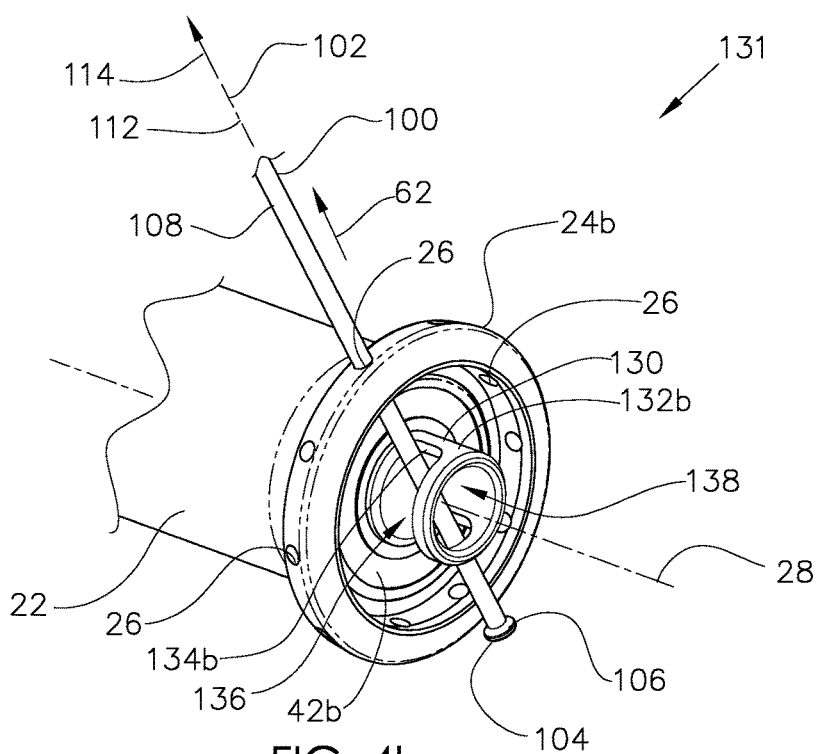
FIG. 4b is a partial perspective view of a third embodiment of the present invention, corresponding to the assembly sequence of FIG. 2d and including a radially extending open side cut of the axle that pierces the outer sidewall surface of the collar portion to provide assembly clearance for the spoke during assembly with its respective hole of the hub flange.

The term "aperture" is defined herein as a relief or an opening in the axle. An aperture may be an enclosed hole extending through the axle 34 (i.e. closed aperture), as is the case of apertures 40a-d, or it may be an open relief in the outer surface of the axle 34 (i.e. open aperture), as shown in FIGS. 4a-b. An aperture requires that the outer surface of the axle 34 is pierced, notched, stepped, or otherwise relieved. The aperture serves to provide assembly clearance for spoke 100 to minimize or eliminate any bending of the spoke 100 as it is assembled to the hub flange 24a or 24b.

Figure 2E:
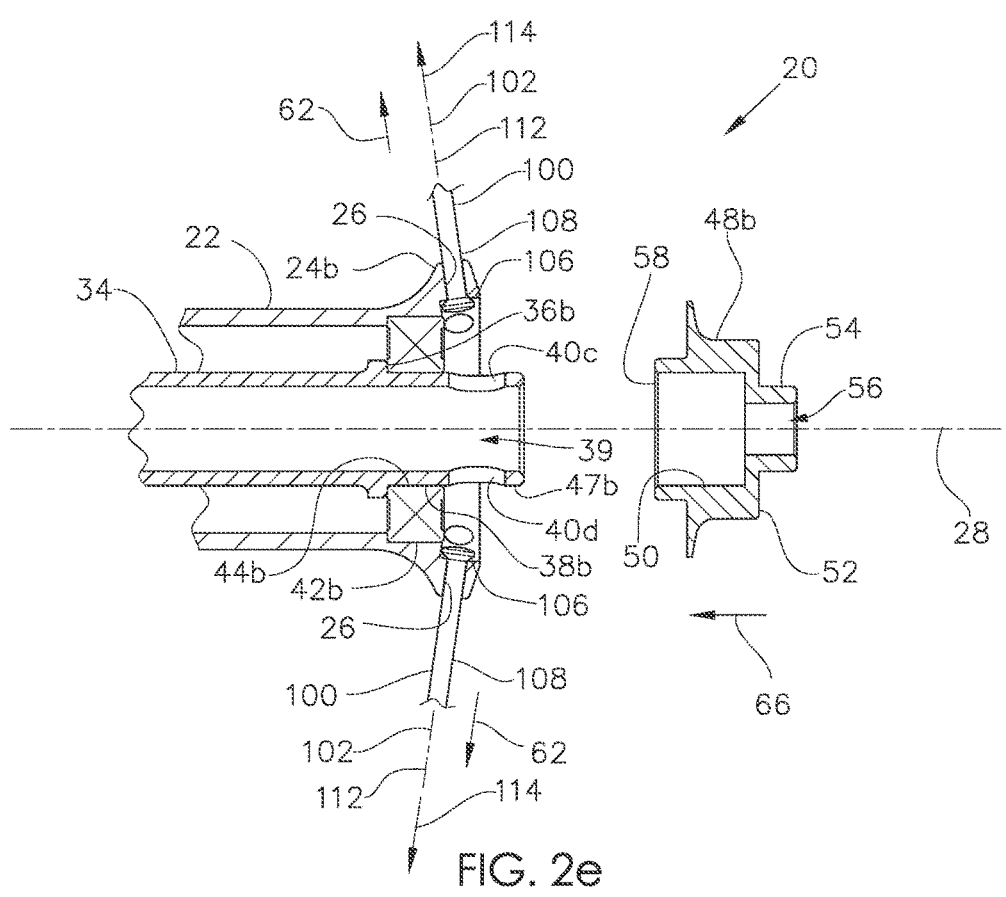
FIG. 2e is a partial exploded cross section view, taken along 90-90, of the embodiment of FIG. 2a, showing a second assembly step, with the spokes fully assembled to the hub flange and the axlecap prior to its assembly to the axle.

FIG. 2e shows a full complement of spokes 100 as next installed and engaged with hub flange 24b in the manner previously described. With the transition portions 106 abutting their respective inboard edges 32, the second ends (not shown) of spokes 100 may be secured to the outer rim (not shown) in the conventional manner. Axle cap 48b is aligned to be sleevably assembled in direction 66 to the projecting portion 47b of the axle 34.

Figure 2F:
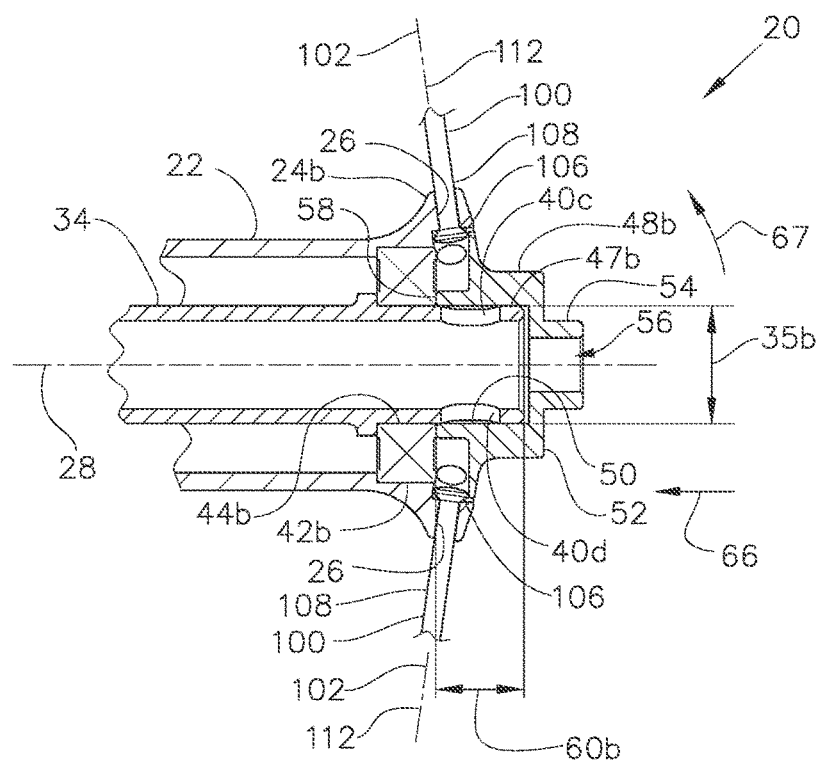
FIG. 2f is a partial cross section view, taken along 90-90, of the embodiment of FIG. 2a, showing a third assembly step, with the spokes fully seated in their respective holes and with the axlecap assembled to the axle.

FIG. 2f shows the axle cap 48b as sleevably assembled to the collar portion 38b in direction 66 until end face 58 axially abuts inner race 44b. Bore 50 is now axially overlapping the collar portion 38b by distance 60b. This overlap distance 60b serves to provide ample piloting and radial engagement of the axlecap 48b with respect to the axle 34. Further, this overlap distance 60b is large enough relative to diameter 35b (length-to-diameter ratio) to adequately resist twisting and/or displacement of the axlecap 48a in direction 67 relative to axle 34 due to radial and other loading commonly experienced by a bicycle wheel. It is preferable that this overlap distance 60b ratio relative to external diameter 35b be at least 0.5 or, more preferably, at least 1.0 to adequately support these radial loads and maintain the piloted alignment between the axlecap 48 and the axle 34. Still further, the axlecap 48b is externally overlapping the projecting portion of the collar portion such that it now covers, conceals, and otherwise obscures the apertures 40c and 40d.

Such a sleeved assembly between an axlecap 48b and axle 34 is well known in industry. Alternatively, there may be other alternate arrangements for assembling an axlecap to an axle. For example the axlecap 48b and axle 34 may be threadably assembled together with internal threads of bore 50 threadably engaged to external threads of projecting portion 47b.

Apertures 40a-d are shown to have an elongated oval opening profile 41, which may be an optimized profile to provide assembly clearance of the spoke 100 with its corresponding hole 26. However, it is understood that a wide range of alternate opening profile shapes may be substituted for the oval opening profile 41 of FIGS. 2a-f, including a circular opening profile, a rectangular opening profile, a notched opening profile, among others.

Paired apertures 40a and 40b (and paired apertures 40c and 40d) are shown as double apertures that are aligned along a common collinear aperture axis 43a (and 43b) that extends in the generally radial direction to have a common axial intercept with the axial axis 28. This collinear alignment may be preferable, since it permits paired apertures 40a and 40b to be fabricated in a single radial plunge of a machining bit. However, it is envisioned that paired apertures 40a and 40b may alternatively have individual aperture axes that are non-collinear and may also be axially staggered to have different axial intercepts along the axial axis 28. It is preferable that the aperture axis 43a and/or 43b be aligned with hole axis 29. Further, it is also envisioned that apertures 40a-d may alternatively have a corresponding aperture axis that extends along an axis that is oblique to the axial axis 28. Still further, it is also envisioned that apertures 40a-d may alternatively have an aperture axis that extends along an axis that is non-radial and is at an angle that is non-orthogonal to the axial axis 28, such as an aperture axis that is aligned along the bracing angle 118 of the spoke. Yet further, it is envisioned that the aperture(s) may alternatively be singular and un-paired, where the collar portion 38a and/or 38b includes only a single aperture that extends through only a single wall of the axle 34. Further still, in the case where the collar portion 38a and/or 38b has a solid cross-section (without opening 39), the corresponding aperture would necessarily be singular and un-paired.

It may be seen that apertures 40c and 40d are oriented to provide the requisite clearance to pass the spoke 100 through an enclosed hole 26 in a generally radial direction as described herein. Also, by including these apertures, an ample axial overlap distance 60b may be achieved. In the absence of such apertures 40c and 40d, hub designers have resorted to design compromises that result in an inferior arrangement.

Figure 3A:
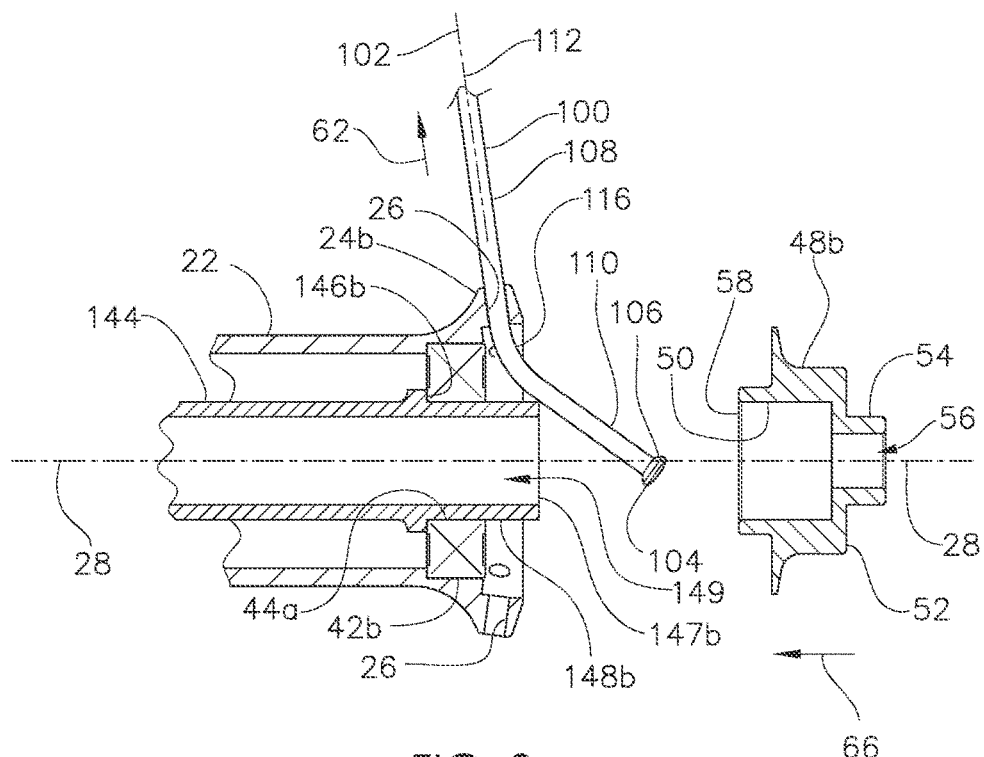
FIG. 3a is a partial exploded cross section view of a first prior art hub assembly, corresponding to the assembly sequence of FIG. 2c, showing the axle as obstructing the assembly of the spoke with its respective hole of the hub flange and the requisite bending and deformation of the spoke during this assembly procedure.

Without apertures 40c and 40d, the spoke 100 must be deformed and bent, as shown in FIG. 3a, so that it may be inserted and passed through hole 26 in direction 62, which also corresponds to a generally radially outward direction. Axle 144 includes shoulder 146b with corresponding collar portion 148b extending axially outwardly therefrom. As shown in FIG. 3a. Axle 144 is of a conventional design in that it is a hollow tubular element with an opening 149 therethrough and end face 147b. Hub shell 22, bearing 42b, and spoke 100 are identical to those described in FIGS. 2a-f. Unlike collar portion 38b of FIG. 2a-f, collar portion 148b is of a conventional design and is not pierced to include apertures 40c and 40d. In the absence of apertures such as 40c and 40d, the spoke 100 must be bent or deflected in order that it may be passed through hole 26 in direction 62. As such, spoke 100 is shown with a bent region 116, which is necessary to provide the requisite access in order to insert the shank portion 108 through the hole 26. In most cases, the spoke 100 is produced from metallic rod and such bending will be difficult, if not impossible, to achieve. Further, such bending will cause permanent yielding and deformation of the spoke 100 causing damage to the finally built wheel (not shown).

Figure 3B:
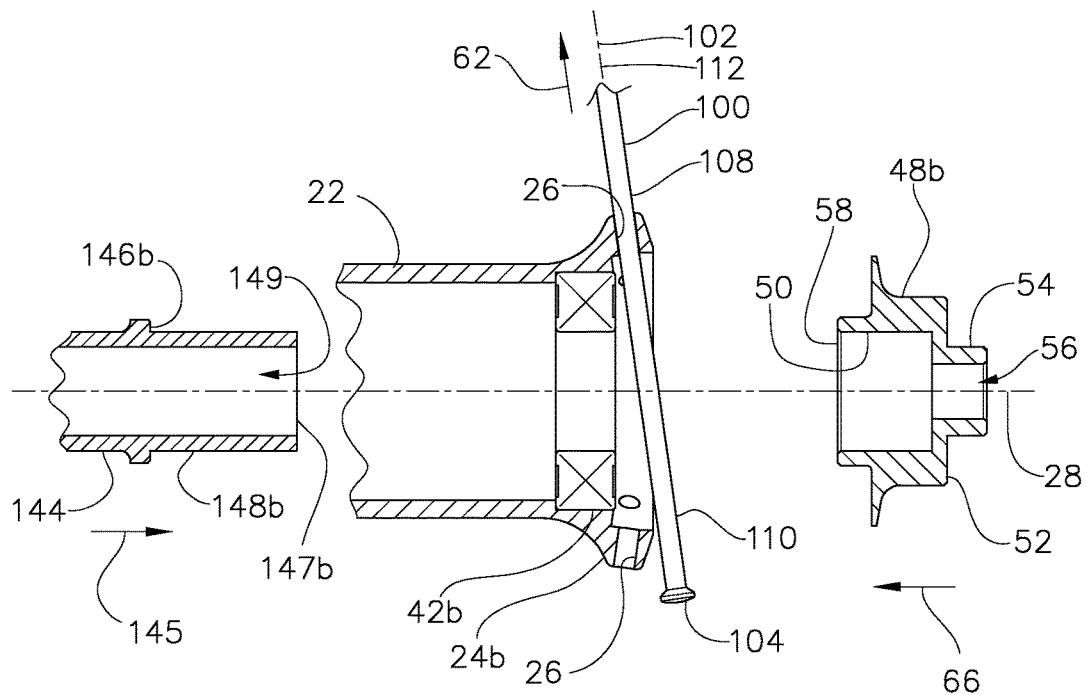
FIG. 3b is a partial cross section view of a second prior art hub assembly, corresponding to the assembly sequence of FIG. 2c, showing the axle as disassembled from the hub shell to permit unobstructed assembly of the spoke during assembly with its respective hole of the hub flange.
Figure 3C:
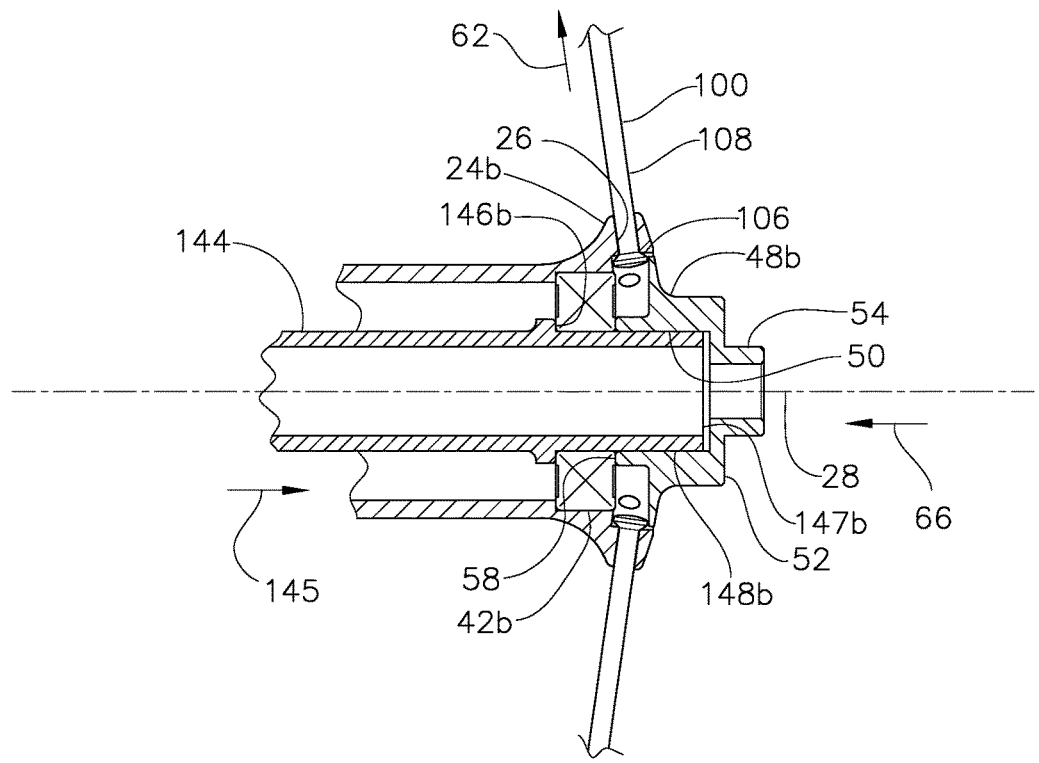
FIG. 3c is a partial cross section view of the prior art hub assembly of FIG. 3b, corresponding to the assembly sequence of FIG. 2f, showing the spokes fully seated in their respective holes and with the axlecap assembled to the axle.

Some prior art designs, as shown in FIGS. 3b-c, require that the axle 34 be completely removed to allow access to the spoke holes 26 and to provide clearance for insertion of spoke 100 or removal of spoke 100 from the hub flange 24b. Axle 144 is identical to that described in FIG. 3a and does not include apertures. Hub shell 22, bearing 42b, and spoke 100 are identical to those described in FIGS. 2a-f. Bearing 42b is shown to be pre-assembled to hub shell 22 in the conventional manner. Axle 144 and axlecap 48b are shown as disassembled from this hub shell 22 pre-assembly. With axle 144 and axlecap 48b out of the way, spoke 100 may be passed through hole 26 in direction 62, as shown and as previously described in FIGS. 2a-f. FIG. 3b corresponds to the assembly sequence described in FIG. 2c. Next, with the full complement of spokes 100 assembled in respective directions 62 through respective holes 26, the the axle 144 may be assembled to the bearing 42b in direction 145 and the axlecap 48b may be assembled to the collar portion 148b in direction 66 in the conventional manner as shown in FIG. 3c to create an assembly similar to that described in FIG. 2f.

It is noted that the arrangement of FIGS. 3b-c requires that the axle 144 and axlecap 48b must be removed from the hub shell 22 in order to install and/or remove a spoke 100. This complete disassembly of the axle 144 from the hub 22 requires special tooling and is a difficult and inconvenient procedure that must be performed every time a spoke 100 is installed, removed, and/or repaired.

Other prior art designs utilize an open slot instead of an enclosed spoke hole 100 to receive the spokes. Such a design is not shown here but is well known in industry. This design permits the spoke to be assembled to the slot in a generally axial direction. This slot serves as a yoke to retain the enlarged head 104 of the spoke 100. However, this slot is inherently weaker than an enclosed hole and the hub flange material around the slot must now be overbuilt to compensate, resulting in a heavier and more expensive assembly. Further, since the spoke may inadvertently slip out of the slot, some sort of secondary retainer must be incorporated to the hub flange to insure that this does not occur. Still further, the slot only partially surrounds the shank of the spoke and the engagement between the slot and the transition surface is less secure than an enclosed hole and may permit the spoke to become ejected from its slot, particularly if the spoke inadvertently loses some of its pre-tension, which commonly occurs due to an impact at the rim or breakage of the spoke.

Figure 3D:
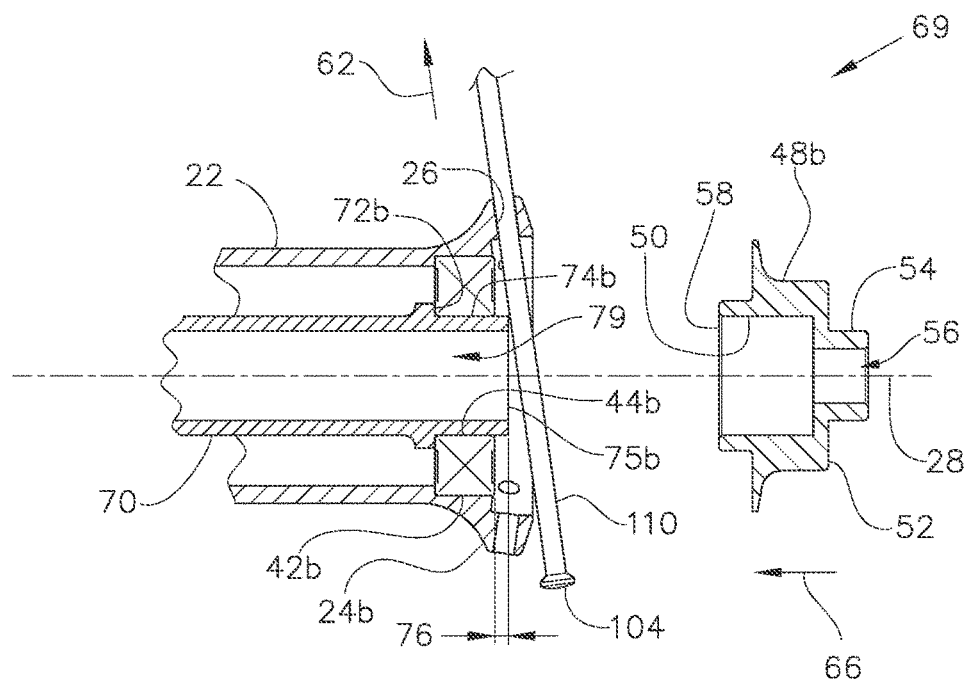
FIG. 3d is a partial cross section view of a third prior art hub assembly, corresponding to the assembly sequence of FIG. 2c, with a shortened axle collar to provide clearance for assembly of the spoke to the hub flange.
Figure 3E:
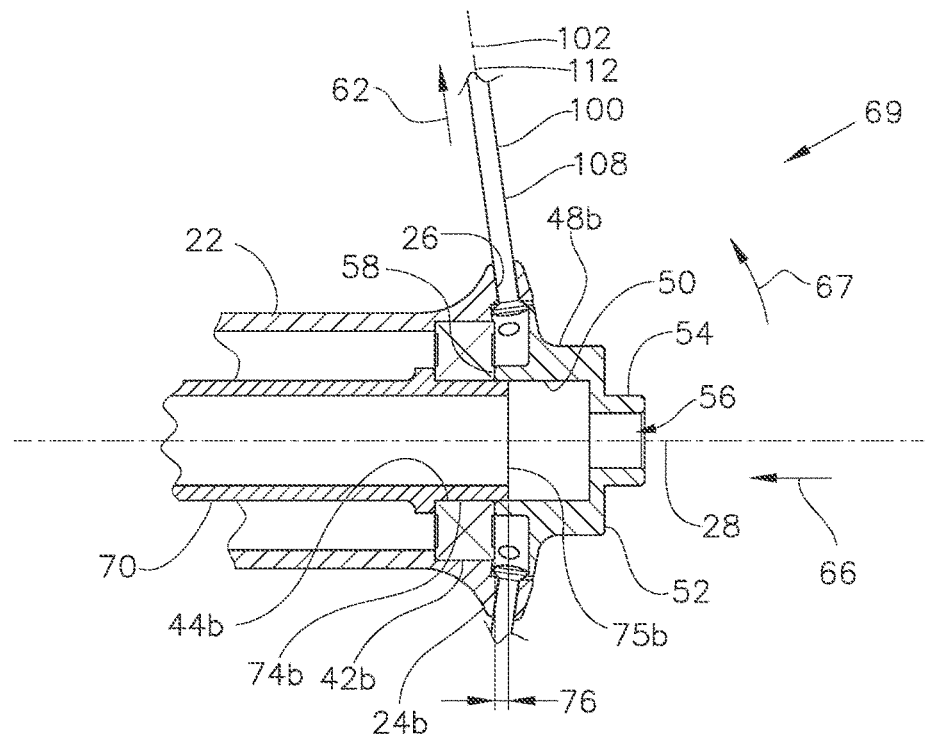
FIG. 3e is a partial cross section view of the prior art hub assembly of FIG. 3d, corresponding to the assembly sequence of FIG. 2f, showing the spokes fully seated in their respective holes and with the axlecap assembled to the axle.

Still other prior art hub assembly 69 designs utilize an axle 70 with a very short collar portion to provide clearance for spoke insertion. Such an arrangement is illustrated in FIGS. 3d-e, where the axle 70 includes collar portion 74b, end face 75b, shoulder 72b, and opening 79. Hub shell 22, axlecap 48b, spoke 100, and bearing 42b are identical to those shown in FIGS. 2a-f. With FIG. 3d corresponding to the assembly sequence described in FIG. 2c, it may be seen that the collar portion 74b projects axially outwardly from inner race 44b by distance 76. Distance 76 must be very short in order to provide the requisite clearance for insertion of the spoke 100 through hole 26 in direction 62. This corresponds to a very short axial overlap distance 76 (in contrast with significantly larger overlap distance 60b shown in FIG. 2f), which fails to provide ample piloting and radial alignment of the axlecap 48a with respect to the axle 70. Thus, once the axlecap 48b is assembled to the axle 70 in direction 66, as shown in FIG. 3e, this minimal overlap distance 76 permits axlecap 48a to be easily displaced in direction 67 and thus may fail to maintain proper alignment and connection between the axlecap 48b and the axle 70. This is highly problematic since the wheel (not shown) commonly experiences high radial and lateral loading, which results in significant bending moment loading in direction 67. As such, this short overlap distance 76 tends to reduce the structural integrity of the wheel.

If the arrangement of FIGS. 3d-e were modified to further recesses the bearing 42b axially inwardly in an attempt to increase the overlap distance 76, this would create further structural compromises to the hub assembly 69. Firstly, by placing the bearings at an axially inward location, stresses on the bearing due to sideloads on the wheel (not shown) will be increased, as will stresses on the hub shell 22 and the axle 70. Further, the bending moment on the sleeved engagement between the bore 50 and the collar 74 will be correspondingly increased, which will reduce or eliminate any advantage of this increased overlap distance 76.

While the embodiment of FIGS. 2a-f shows apertures 40a-d as enclosed holes extending through their associated collar portions 38a and 38b, the apertures may take on a variety of alternate configurations in order to allow the spoke 100 to be assembled and passed through hole(s) 26 and to reduce the amount of bending (shown as bent region 116 of FIG. 3*a*) required for this assembly. For example, the apertures 124*c* and 124*d* may be configured as open slots as described in FIG. 4*a*. As shown in hub assembly 119 of FIG. 4*a*, which is shown to correspond to the assembly sequence of FIG. 2*d*, hub shell 22, bearing 42*b*, axlecap 48 (not shown), and spoke 100 are identical to those described in FIGS. 2*a-f*. Axle 120 is substituted for axle 34 of FIGS. 2*a-f* and includes collar portion 122*b*. Axle 120 is shown as a hollow tubular axle with opening 126 therethrough. Collar portion 122*b* includes apertures 124*c* and 124*d* that are configured as open slots with respective axial extending openings 128*c* and 128*d* that extend to intersect end face 129 of axle 120. Axle 130 is otherwise identical to axle 34 of FIGS. 2*a-f*. Thus, the apertures 124*c* and 124*d* are generally radially opposed and aligned with each other to provide assembly clearance for spoke 100 and to minimize or eliminate any bending of the spoke 100 as it is passed through hole 26 in direction 62 as shown in FIG. 4*a*. Apertures 124*c* and 124*d* may also be considered as multiple aligned apertures, since the axle 130 includes two apertures 124*c* and 124*d* that are separated by opening 126 that are aligned to be associated with the corresponding hole 26.

Another example of an alternate aperture configuration is described in FIG. 4*b*, where an aperture may be configured as a side cut or notch. As shown in the hub assembly 131 of FIG. 4*b*, which is shown to correspond to the assembly sequence of FIG. 2*d*, hub shell 22, bearing 42*b*, axlecap 48 (not shown), and spoke 100 are identical to those described in FIGS. 2*a-f*. Axle 130 is substituted for axle 34 of FIGS. 2*a-f* and includes collar portion 132*b*. Axle 130 is shown as a hollow tubular axle with opening 138 therethrough. Collar portion 132*b* includes aperture 134*b* that is configured as a side cut or a side notch to create an opening 136 that constitutes a radially extending open relief in the outer surface of the collar portion 132*b*. As such, aperture 134*b* may be considered to be a radially extending open aperture. Thus, the aperture 134*b* serves to provide assembly clearance for spoke 100 to minimize or eliminate any bending of the spoke 100 as it is passed through hole 26 in direction 62 as shown in FIG. 4*b*. It is preferred that aperture 134*b* be radially relieved by at least 3 millimeters from the inside diameter of bearing 42*b* to provide assembly clearance for the spoke 100. Aperture 134*b* may also be considered a singular aperture, since the axle 130 includes only a singular aperture 134*b* to provide assembly clearance of the spoke 100 with its corresponding hub flange 24*b*.

Figure 4C:
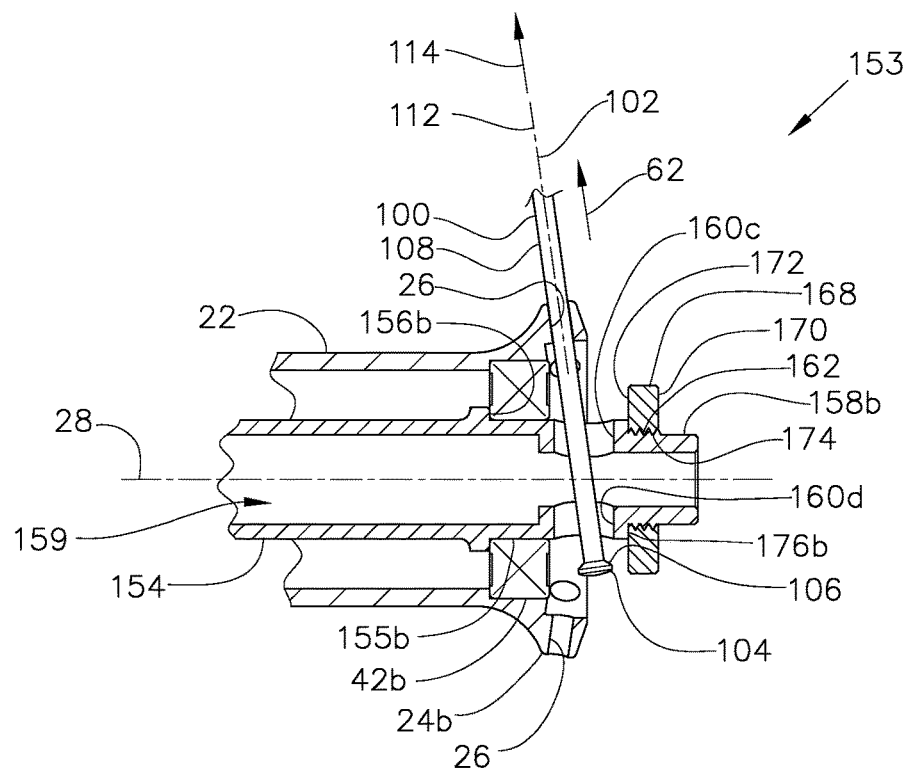
FIG. 4c is a partial cross section view of a fourth embodiment of the present invention, corresponding to the assembly sequence of FIG. 2c and including an exposed collar portion with exposed apertures, and with an axlecap installed on the axle that does not axially overlap and/or conceal the apertures.

FIG. 4*c* describes an alternate embodiment where the apertures 160*c-d* are not concealed or covered. As shown in the hub assembly 153 of FIG. 4*c*, which is shown to correspond roughly to the assembly sequence of FIG. 2*c*, hub shell 22, bearing 42*b*, and spoke 100 are identical to those described in FIGS. 2*a-f*. Axle 154 is substituted for axle 34 of FIGS. 2*a-f* and includes collar portion 155*b*, shoulder 156*b*, stub collar 158*b*, and shoulder 176*b*. Axle 154 is shown as a hollow tubular axle with opening 159 therethrough. Collar portion 155*b* includes apertures 160*c* and 160*d* that are similar to apertures 40*c-d* of FIGS. 2*a-f* and externally threaded portion 162. Axlecap 168 includes grip face 170, back face 172, and an internally threaded hole 174 therethrough. The axle 154, bearing 42*b*, and hub shell 22 are assembled in a manner similar to that described in FIGS. 2*a-d*. Axlecap 168 is then assembled to axle 154 with internally threaded hole 174 threadably assembled and engaged to externally threaded portion 162 until back face 172 is axially abutting shoulder 176*b*. In the manner previously described in FIGS. 2*a-f*, the spoke 100 may be assembled to the hub flange 24*b* by passing the shank portion 108 through apertures 168*c* and 168*d* and through hole 26. Thus, the apertures 160*c* and 160*d* serve to provide assembly clearance for spoke 100 to minimize or eliminate any bending of the spoke 100 as it is passed through hole 26 in direction 62 as shown in FIG. 4*c*. When the spoke 100 is fully threaded through the hole 26, the transition surface 206 engages the radially inboard edge of hole 26 to support tensile load 114 in the conventional manner.

Since the apertures 160*c*160*d* are left exposed, the axlecap 168 need not be unassembled or removed in order to assemble the spoke 100 to the hub flange 24*b*. While the axlecap 168 is shown to be a separate element from the axle 154, it is envisioned that the axle 154 may alternatively include geometry that may be otherwise be associated with an axlecap 168, allowing the axlecap to be eliminated altogether.

FIGS. 2*a-f* and FIGS. 4*a-c* all show embodiments where their respective apertures are positioned to be axially outboard of their corresponding bearing. In contrast, FIG. 4*d* describes an alternate embodiment where the apertures 190*c-d* are positioned to be axially inboard of the bearing 42*b*. As shown in the hub assembly 183 of FIG. 4*d*, which is shown to correspond roughly to the assembly sequence of FIG. 2*c*, bearing 42*b* and spoke 100 are identical to those described in FIGS. 2*a-f*. Axle 184 is substituted for axle 34 of FIGS. 2*a-f* and includes collar portion 185*b*, shoulder 186*b*, stub collar 188*b*, externally threaded portion 192*b* and shoulder 206*b*. Axle 184 is shown as a hollow tubular axle with opening 189 therethrough. Axle 184 includes apertures 190*c* and 190*d* therethrough that are axially inboard of bearing 42*b*. Axlecap 198 includes grip face 200, back face 202, and an internally threaded hole 204 therethrough. Hub shell 208 includes hub flange 209*b* and bearing bore 212*b* with shoulder 216*b*. The hub flange 209*b* is positioned to be axially inboard of bearing 42*b* and includes a generally radially extending hole 210 to receive spoke 100 as also described in FIG. 2*c*. Hub shell 208 also includes access hole 214 that is generally aligned with and opposed to hole 210 and is positioned to provide access and permit the spoke 100 to be threaded and inserted through the hole 210 in direction 62 as shown.

Figure 4D:
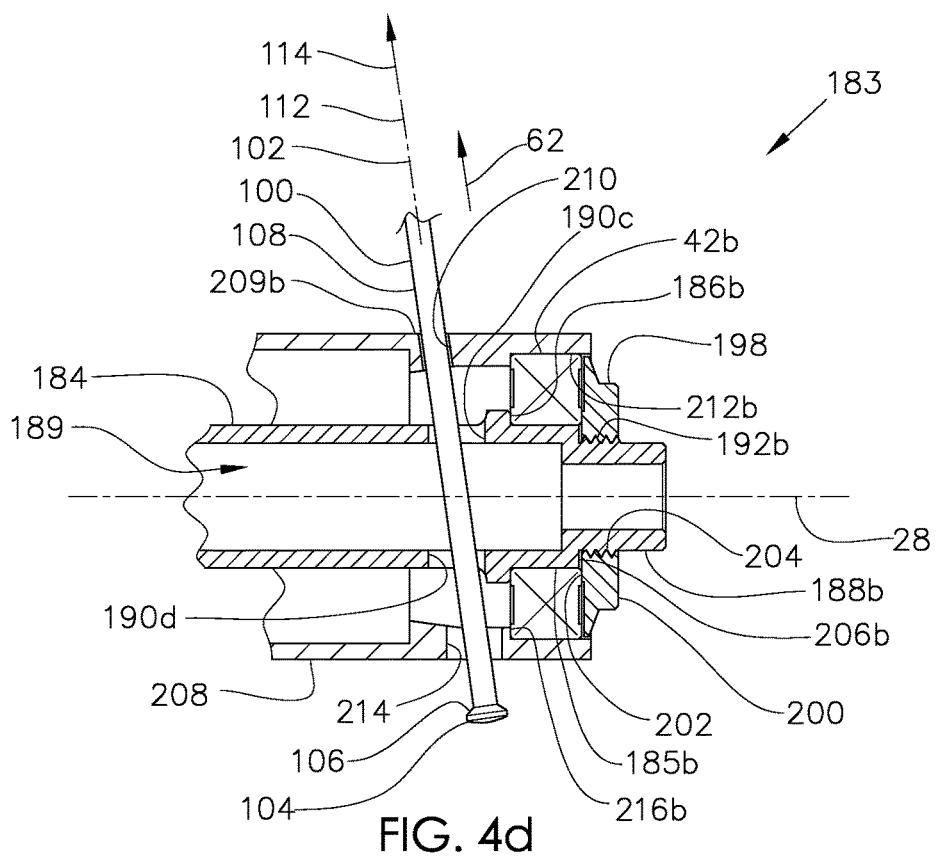
FIG. 4d is a partial cross section view of a fifth embodiment of the present invention, corresponding to the assembly sequence of FIG. 2c and including an axle with apertures axially inboard of the bearing and with a hub shell having spoke holes axially inboard of the bearing.

The axle 184, bearing 42*b*, and hub shell 208 are assembled in a manner similar to that described in FIGS. 2*a-d*. Axlecap 198 is next assembled to axle 184 with internally threaded hole 204 threadably assembled to externally threaded portion 192*b* until back face 202 is axially abutting the inner race of bearing 42*b*. In the manner previously described in FIGS. 2*a-f*, the spoke 100 may be assembled to the hub flange 209*b* by passing the shank portion 108 in direction 62 through access hole 214, then through apertures 198*d* and 198*c*, and finally through hole 210. Thus, the access hole 214 and apertures 198*c* and 198*d* serve to provide assembly clearance for spoke 100 to minimize or eliminate any bending of the spoke 100 as it is passed through hole 210 in direction 62 as shown in FIG. 4*d*. When the spoke 100 is fully threaded through the hole 210, the transition surface 206 engages the radially inboard edge of hole 210 to support tensile load 114 in the conventional manner.

While my above description contains many specificities, these should not be construed as limitations on the scope of the invention, but rather as exemplifications of embodiments thereof. For example:

The aperture described herein may take on a variety of forms in addition to those described herein. For example, the aperture may be a circumferential relief, a circumferential step, or a circumferential groove in the axle.

As shown in the embodiments herein, the axles are shown to be hollow axles, with openings therethrough. This is commonly the preferred configuration, since it generally creates a strong and stiff axle element with a minimum of weight. However, the present invention may similarly be adapted to a wide range of alternate axle configurations, including a solid axle or an axle with a combination of hollow portions and solid portions.

As shown in the embodiments herein, the spoke hole of the hub flange, as well as the longitudinal axis of the spoke, are shown to create a spoke alignment commonly referred to as "radial lacing", where the longitudinal axis of the span portion projects to pierce the axial axis. This radial lacing has been shown herein to provide schematic illustration and to describe how the axle may be relieved with an aperture to facilitate assembly of a spoke through the spoke hole of the hub flange. However, it should be understood that such reliefs or apertures may also facilitate such assembly in the case where the spoke lacing is tangential or oblique. In a tangential or oblique lacing configuration, the projected longitudinal axis of the span portion extends to a point radially offset from the axial axis. Often, such tangential or oblique lacing results in "crossed lacing", where the span portions of two (or more) spokes cross each other, as viewed in the plan view of the wheel (i.e. view along the axial axis where the outer rim is shown as circle). In such a case, the embodiment of FIG. 4b may be particularly applicable, and the aperture may have a shallower dept of relief relative to the outer surface of the axle.

While the embodiments shown herein describe apertures that provide assembly clearance for the spoke during assembly of the spoke to the spoke hole, it is also envisioned that the aperture may alternatively have interference with spoke during assembly of the spoke to the spoke hole. In such a case, the opening profile of the aperture is minimized such that it only provides partial relief for this assembly. As such, there may still be a minimal interference between the spoke and the aperture such that the spoke must still be laterally bent or flexed during assembly of the spoke to the spoke hole. Nevertheless, this minimized aperture opening profile serves to reduce this amount of lateral bending or flex of the spoke that would otherwise be required if this aperture were absent or omitted.

The spoke hole of the hub flange is shown to be a closed hole that surrounds the longitudinal axis of the spoke, with two open ends to receive the spoke. However it is envisioned that the spoke hole may alternatively be configured as an open slot or an opening of the hub flange that may not necessarily completely surround the longitudinal axis of the spoke.

Bearings 42a and 42b are shown to be conventional cartridge units that commonly include an outer race and an inner race, with a series of rolling elements in between. These bearings are merely representative of a common method to facilitate easy and efficient rotation of the hub shell about the axle. Alternatively, a wide variety of alternate bearing designs may be substituted, including plane bearings, etc.

The axlecap 48b of FIGS. 2a-f is shown to be externally overlapping the axle 34. However, an axlecap may alternatively be configured to internally overlap the axle. In such a case, the axlecap would include a collar or sleeve that would extend within opening 39 to axially overlap the axle 34.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel hub assembly, comprising:
   a central axle extending along an axial axis, including an outer surface thereof;
   an outer hub shell rotatable about said axial axis relative to said axle;
   a bearing to facilitate said rotation of said hub shell relative to said axle, wherein said bearing includes an outer race rotationally fixed to said hub shell and an inner race rotationally fixed to said axle;
   wherein said hub shell includes at least one hub flange to include at least one opening therein extending along an opening axis;
   including at least one spoke connected to said hub flange at said opening, wherein said spoke is assembled to said hub flange through said opening;
   wherein said axle includes an aperture therein that serves to provide assembly clearance for said spoke to one of reduce or eliminate deformation of said spoke during said assembly of said spoke with said opening.

2. The vehicle wheel hub assembly according to claim 1, wherein said axle includes a collar portion with a projecting portion extending axially outwardly from said bearing and wherein said aperture is in said projecting portion.

3. The vehicle wheel hub assembly according to claim 2, wherein said hub flange includes a multiplicity of said openings, including a first opening and a second opening; wherein said axle may be selectively rotationally indexed about said axial axis and relative to said hub shell between a first aperture position and a second aperture position; wherein said aperture serves to facilitate assembly of a first of said spokes with said first opening in said first aperture position; and wherein said aperture serves to facilitate assembly of a second of said spokes with said second opening in said second aperture position.

4. The vehicle wheel hub assembly according to claim 2, wherein said aperture is a singular aperture to provide a singular relief in said outer surface of said projecting portion.

5. The vehicle wheel hub assembly according to claim 2, including an axle cap connected to said axle and positioned to extend axially outwardly from said bearing, wherein said axle cap is sleevably engaged to said projecting portion along said axial axis.

6. The vehicle wheel hub assembly according to claim 5, wherein said bearing includes an inner race and wherein said axle cap axially abuts said inner race.

7. The vehicle wheel hub assembly according to claim 5, wherein at least one of said axle and said axle cap includes an axially outwardly facing grip face.

8. The vehicle wheel hub assembly according to claim 2, including an axle cap connected to said axle and positioned to extend axially outwardly from said bearing, wherein said axle cap is threadably engaged to said projecting portion along said axial axis.

9. The vehicle wheel hub assembly according to claim 2, including an axle cap connected to said axle and positioned to extend axially outwardly from said bearing, wherein said axle cap is axially overlapping said axle in an overlap region along said axial axis.

10. The vehicle wheel hub assembly according to claim 9, wherein said axle cap is externally overlapping said projecting portion in said overlap region.

11. The vehicle wheel hub assembly according to claim 10, wherein said axle cap serves to at least one of conceal and obscure said aperture.

12. The vehicle wheel hub assembly according to claim 9, wherein said axle cap axially abuts said axle.

13. The vehicle wheel hub assembly according to claim 9, including an axial length of overlap of said overlap region, and wherein said projecting portion has a cross section external dimension at said overlap region, and wherein the ratio of said axial length of overlap to said external dimension is greater than 0.5.

14. The vehicle wheel hub assembly according to claim 9, including an axial length of overlap of said overlap region, and wherein said projecting portion has a cross section external dimension at said overlap region, and wherein the ratio of said axial length of overlap to said external dimension is greater than 1.

15. The vehicle wheel hub assembly according to claim 1, wherein said aperture may be radially aligned with said opening.

16. The vehicle wheel hub assembly according to claim 1, wherein said aperture is generally axially aligned with said opening.

17. The vehicle wheel hub assembly according to claim 1, wherein said spoke includes a longitudinal axis, and wherein said aperture is generally aligned with said longitudinal axis during said assembly of said spoke to said hub flange.

18. The vehicle wheel hub assembly according to claim 1, wherein said aperture is rotatable about said axial axis relative to said hub flange to selectively align said aperture relative to said opening.

19. The vehicle wheel hub assembly according to claim 1, wherein said aperture is a closed aperture.

20. The vehicle wheel hub assembly according to claim 1, wherein said aperture is a radially extending open aperture.

21. The vehicle wheel hub assembly according to claim 1, wherein said aperture is an axially extending open aperture.

22. The vehicle wheel hub assembly according to claim 1, wherein said aperture includes an aperture axis and wherein said aperture axis is generally aligned with said opening axis.

23. The vehicle wheel hub assembly according to claim 1, wherein said axle is a hollow axle including an internal cavity and an outer wall and wherein said aperture pierces through said outer wall into said inner cavity.

24. The vehicle wheel hub assembly according to claim 23, wherein said aperture is a double aperture, including a first aperture that pierces through said outer wall into said inner cavity and a second aperture that pierces through said outer wall into said inner cavity, wherein said first aperture is aligned with said second aperture.

25. The vehicle wheel hub assembly according to claim 24, wherein said first aperture is generally radially opposed to said second aperture about said axial axis.

26. The vehicle wheel hub assembly according to claim 1, wherein said bearing includes an inner race with a cylindrical inside diameter and wherein said aperture is a radially extending open aperture that is radially inwardly relieved from said inside diameter by at least 3 millimeters.

27. The vehicle wheel hub assembly according to claim 1, wherein said axle constitutes a generally hollow element including an internal cavity extending therein along said axial axis and wherein said aperture communicates with said internal cavity.

28. The vehicle wheel hub assembly according to claim 1, wherein said aperture is located axially outwardly of said bearing.

29. The vehicle wheel hub assembly according to claim 1, wherein said aperture is located axially inwardly of said bearing.

30. The vehicle wheel hub assembly according to claim 1, wherein said opening is an enclosed opening that surrounds the cross section of said spoke.

* * * * *